Figure 1:
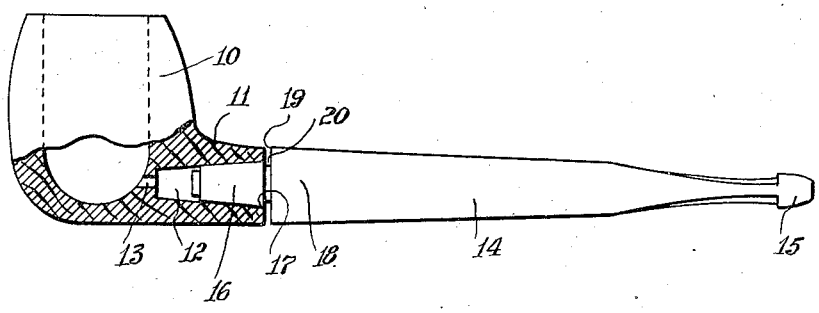

May 27, 1947.　　　D. P. LAVIETES　　　2,421,338
SMOKER'S PIPE
Filed June 13, 1944

David P. Lavietes INVENTOR.

BY Frank P. Wentworth
his ATTORNEY.

Patented May 27, 1947

2,421,338

UNITED STATES PATENT OFFICE 2,421,338

SMOKER'S PIPE

David P. Lavietes, Brooklyn, N. Y.

Application June 13, 1944, Serial No. 540,014

4 Claims. (Cl. 131—225)

The invention relates to smokers' pipes and more particularly to a pipe having a briar wood bowl and integral stem and a push bit.

In the production of smokers' pipes having a briar wood bowl and an integral stem, difficulty has always been experienced in attaching a bit to the stem in a manner to secure a tight, non-seeping joint between the end of the stem and the end of the bit. Even if a sufficiently tight joint be secured by abutting the end of the bit about the tenon against the end of the stem, tar, pitch, etc., extracted from tobacco being smoked, will at times, accumulate in the stem between the bottom of the bowl and the bit attaching means even though seepage through the joint between the end of bit and the end of the stem may not occur. Such accumulation may be to an extent to make removal of the bit, when cleaning a pipe, so difficult that cracking or breakage of the bit tenon or of the stem frequently occurs because of the strong torque necessarily developed by the force applied to the bite of a bit which is at a point remote from the stem. Such cracking or breakage of either the stem or of the tenon of the bit destroys the utility of a pipe.

The above conditions exist with both screw threaded and ordinary push tenon bits as commonly used, since with both types of bits, the seal against seepage is usually formed by pressing the end of the bit about the tenon tightly against the end of the stem by pressure lengthwise of the bit and the stem. Binding or freezing of a bit and a stem frequently occurs from imperfect contact areas between a tenon and a co-operating socket in the stem when such is used for attaching a bit to the stem. This is particularly true of a screw bit where a sufficiently tight fit of the threads of the two parts is difficult to secure with mass production.

I have heretofore produced a pipe having secured to the end of the stem a metal fitting having a truncated conical member projecting from the end of the stem into a position where it could be engaged by a complementary socket in a metal fitting countersunk in the end of the bit. This construction of pipe, except for difficulty in cleaning the stem, has the advantage of minimizing liklihood of binding or freezing of the joint between the stem and the bit because much of the tar, pitch, etc., is retained in the stem and the bottom of the bowl and cannot enter the space between the co-operating surfaces of the metal fittings.

It is also a well known practice to provide a pipe the bowl of which is formed of briar wood with an integral stem and the bit of which has a metal fitting of the push bit type the tenon of which is adapted to enter a socket in the end of the stem. To prevent as much as possible, seepage at the joint between the stem and the metal tenon due to the difficulty of securing a metal to hard wood fit which is sufficiently tight, the socket adjacent the end of the stem, has a thin liner of highly compressible material, usually cork, which forms a tight joint or seal with the tenon. This liner with continued use of a pipe is apt to crumble or break down, or to be withdrawn from the socket when removing the bit.

My present invention is directed to a pipe having a bowl and an integral stem made of briar wood, and a push bit formed of fairly resilient material having a tenon adapted to be used in detachably connecting the bit to the stem in a manner to form a tight, non-seeping joint directly with the wall of the socket in the briar wood of the stem.

In a pipe embodying the invention, the form of the socket and of the tenon of the bit are not only such as to ensure a tight, non-seeping joint, but are such as to permit the tenon to adapt itself to the socket in securing such a fit with ordinary production methods as well as with changing dimensions in the socket and the tenon while a pipe is in use.

Turning of the bit when alining its bite with the bowl, does not interfere with the formation of a tight, non-seeping joint, but may be relied upon to supplement endwise movement of the bit to secure the maximum sealing action of the parts of the joint.

An effective joint between the stem and the tenon of the bit can be secured in a pipe embodying the invention and the manufacturing and other difficulties present when metal fittings and a compressible liner for the stem are used, is avoided. No great nicety in the dimensions and finish of the socket or of the tenon is required to ensure the close fitting of these parts, so that bowls and bits may be produced in volume and no selection of any such parts is required to ensure a proper fit with the other part in assembling a pipe because any of these parts will readily adapt itself to the other whenever a bit is inserted in the stem socket.

The invention consists primarily in a smoker's pipe embodying therein a bowl having an integral stem formed of briar wood, said stem having a socket of a truncated conical form with its largest diameter opening outwardly of its end, and a bit of resilient material having a truncated conical tenon symmetrical with but of a length shorter than the depth of said socket with its end of largest diameter presented towards and spaced from an adjacent part of the bit of larger diameter than the largest diameter of said tenon whereby the bit may have variable lengthwise and turning movement in relation to the stem to cause the tenon and the socket to adapt themselves to each other and form a tight, non-seeping joint between the socket and the tenon; and in such other novel structural characteristics as are hereinafter set forth and described and more particularly pointed out in the claims hereto appended.

Figure 2:
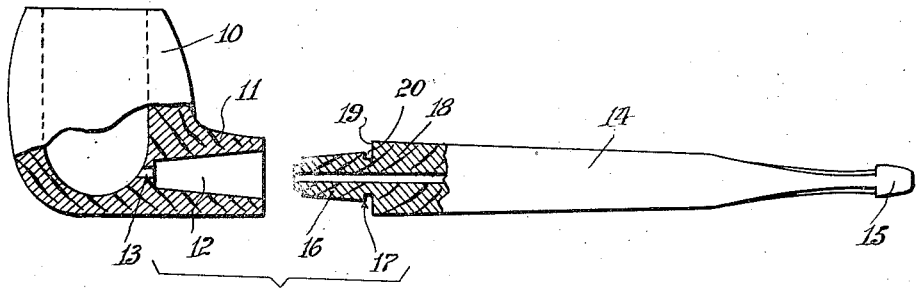

Referring to the drawings,

Fig. 1 is a side elevation of a smoker's pipe embodying the invention with the lower part of the bowl and the stem shown in section, and Fig. 2 is a similar view with the bit positioned for application to the stem, the tenon and adjacent portion of the bit being shown in section.

Like numerals refer to like parts in both of said views.

The pipe shown in the drawings has a bowl 10 having an integral stem or shank 11 made of ordinary briar wood. In the end of the stem or shank 11 is a socket 12 of truncated conical form, the portion of the socket of smallest diameter communicating with the bore of the bowl through a smoke opening 13. The wall of the socket 12 extends at an acute angle to the axis of the socket with its largest diameter opening outwardly of the end of the stem or shank.

The bit 14 which may be made of wood, rubber or other material having some resiliency however slight, has the usual bite 15 at its free end and a tenon 16 at its opposite end by means of which it may be secured to the stem 11 by cooperation with the socket 12. The tenon 16 is symmetrical with the socket 12, being of truncated conical form with its outer face having the same degree of angularity to the axis of the socket 12 as the wall of the socket but being of a length shorter than the depth of the socket. The end 17 of the tenon 16 having the largest diameter is presented towards and spaced from the adjacent portion 18 of the bit which being of larger diameter than the largest diameter of the tenon, provides a shoulder 19 about the tenon.

To secure a tight, non-seeping joint between the stem and the bit solely by the contacting areas of the wall of the socket 12 and the outer face of the tenon 16, it is essential that movement of the bit axially of the stem be unrestricted except by engagement of the tenon with the wall of the socket and that the shoulder 19 shall not, by engagement with the end of the stem place any limitation upon the movement of the bit. In the drawings, I have shown the bit as having a shallow channel 20 between the tenon 16 and the shoulder 19 which so spaces the tenon from the shoulder as to preclude engagement of the shoulder with the end of the stem even if the tenon should enter the socket to an extent slightly greater than required to bring the end of the tenon flush with the end of the stem when forming the seal. This may occur from slight variances in the dimensions of sockets in different stems or of different tenons. Variable movement of the bit when applying it to the stem must be provided for since such variances may occur during manufacture of either the bowls and their stems or of the bits or the materials of different bowls or tenons may have a variable degree of resiliency or compressibility due to properties inherent thereto.

It is apparent that it is merely necessary that the shoulder 19 on the bit be spaced slightly from the portion of the tenon of largest diameter to permit this variable movement of the tenon.

It is also obvious that the length of the tenon must be less than the depth of the socket to permit that slight variability of movement of the bit necessary to secure a close fit of the tenon within the socket.

The required variance of movement of the tenon and spacing of the tenon from the adjacent portion of the bit to permit this movement, may be very slight one thirty-second of an inch ordinarily being adequate.

In manufacturing pipes of the push bit type, production conditions are such as to preclude the grinding or the scraping of parts to secure a close fit and remove any rough spots developed during drilling and turning operations. In a pipe embodying the invention, slight defects or blemishes in the inner surface of the socket 12 or outer face of the tenon 16, may be corrected by lengthwise pressure on, and slight turning of the bit such as is resorted to in alining the bite of the bit in relation to the bowl. In this manner, the tenon will have sufficient movement within the socket to find a firm seat in, or adapt itself to, the socket irrespective of such defects or blemishes, notwithstanding that the quantity of lengthwise movement of the tenon of different bits may vary as to different bowls, or even as to the same bowl at different times due to slight swelling of the stem or of the tenon from absorption of tar, pitch, etc., developed with use of the pipe.

The construction also admits of the formation of a tight seal without excessive pressure on the bit, so that when a pipe is to be cleaned, the bit may be readily removed. If the stem or the tenon should swell from or become slightly coated with, tar, pitch, etc., the bit after cleaning of the pipe can be reapplied to the stem without difficulty because of the capability of forming a tight seal with variable movement of the bit.

The degree of angularity of the contacting surfaces of the socket and of the bit need not be great, an angle of about five degrees having been found to give highly satisfactory results.

It is not my intention to limit the invention to the particular style of pipe, nor to the exact dimensions of parts, shown in the drawings, since such may be varied without departing from the spirit and scope of the invention.

Having described the invention, what I claim as new and desire to have protected by Letters Patent is:

1. A smoker's pipe embodying therein a bowl having an integral stem formed of briar wood, said stem having a socket of a truncated conical form with its largest diameter opening outwardly of its end, and a bit of resilient material having a truncated conical tenon symmetrical with but of a shorter length than the depth of said socket, an adjacent part of the bit being of larger diameter than the largest diameter of said tenon, the end of the tenon of largest diameter being presented toward but spaced away from the larger diameter of the bit, whereby the bit may have variable lengthwise and turning movement in relation to the stem to cause the tenon and the socket to adapt themselves to each other and form a tight, non-seeping joint between the socket and the tenon.

2. A smoker's pipe embodying therein a bowl having an integral stem formed of briar wood, said stem having a socket of a truncated conical form with its largest diameter opening outwardly of its end, and a bit of resilient material having a truncated conical tenon symmetrical with but of a shorter length than the depth of said socket, said bit having a shoulder of larger diameter than the largest diameter of said tenon and spaced apart therefrom whereby lengthwise movement of the bit cannot be restricted by engagement of said shoulder with the end of the stem and the bit may have variable lengthwise and turning movement in relation to the stem to cause the tenon and the socket to adapt themselves to each other and form a tight, non-seeping joint between the socket and the tenon.

3. A smoker's pipe embodying therein a bowl having a bore with a smoke opening and having an integral stem formed of briar wood, said stem having a socket of truncated conical form with its largest diameter opening outwardly of its end and its smallest diameter communicating with said bowl bore through the smoke opening, and a bit of resilient material having a truncated conical tenon symmetrical with but of a shorter length than the depth of said socket, said bit having a shoulder of larger diameter than the largest diameter of said tenon and spaced apart therefrom whereby lengthwise movement of the bit cannot be restricted by engagement of said shoulder with the end of the stem and the bit may have variable lengthwise and turning movement in relation to the stem to cause the tenon and the socket to adapt themselves to each other and form a tight, non-seeping joint between the socket and the tenon.

4. A smoking pipe having a brier wood bowl with a stem projecting therefrom, said stem having a conical socket which is tapered inwardly from the outer end of the stem and a bit having a truncated tenon on one end fitted in the socket of the stem of the bowl, the length of the tenon being less than the depth of the socket and its greatest diameter being less than the greatest diameter of the socket, said bit having a shoulder whose greatest outer diameter is approximately the same as the outer diameter of the stem at the entrance to the socket and spaced apart longitudinally from the greatest diameter of the tenon to permit the tenon to be seated in the socket but preventing the shoulder from engaging the stem.

DAVID P. LAVIETES.

REFERENCES CITED

The following references are of record in the file of this patent:

UNITED STATES PATENTS

| Number | Name | Date |
|---|---|---|
| 1,439,032 | Stevens | Dec. 19, 1922 |
| 1,671,960 | Anchor | June 5, 1928 |
| 1,888,462 | Lavietes | Nov. 2, 1932 |

FOREIGN PATENTS

| Number | Country | Date |
|---|---|---|
| 1,298 | Great Britain | Jan. 23, 1905 |